May 4, 1954
L. H. FISLER
2,677,173
AUTOMATIC MACHINE FOR FORMING AND
MOUNTING CRYSTAL DIODE ELECTRODES
Filed June 20, 1947
6 Sheets-Sheet 1
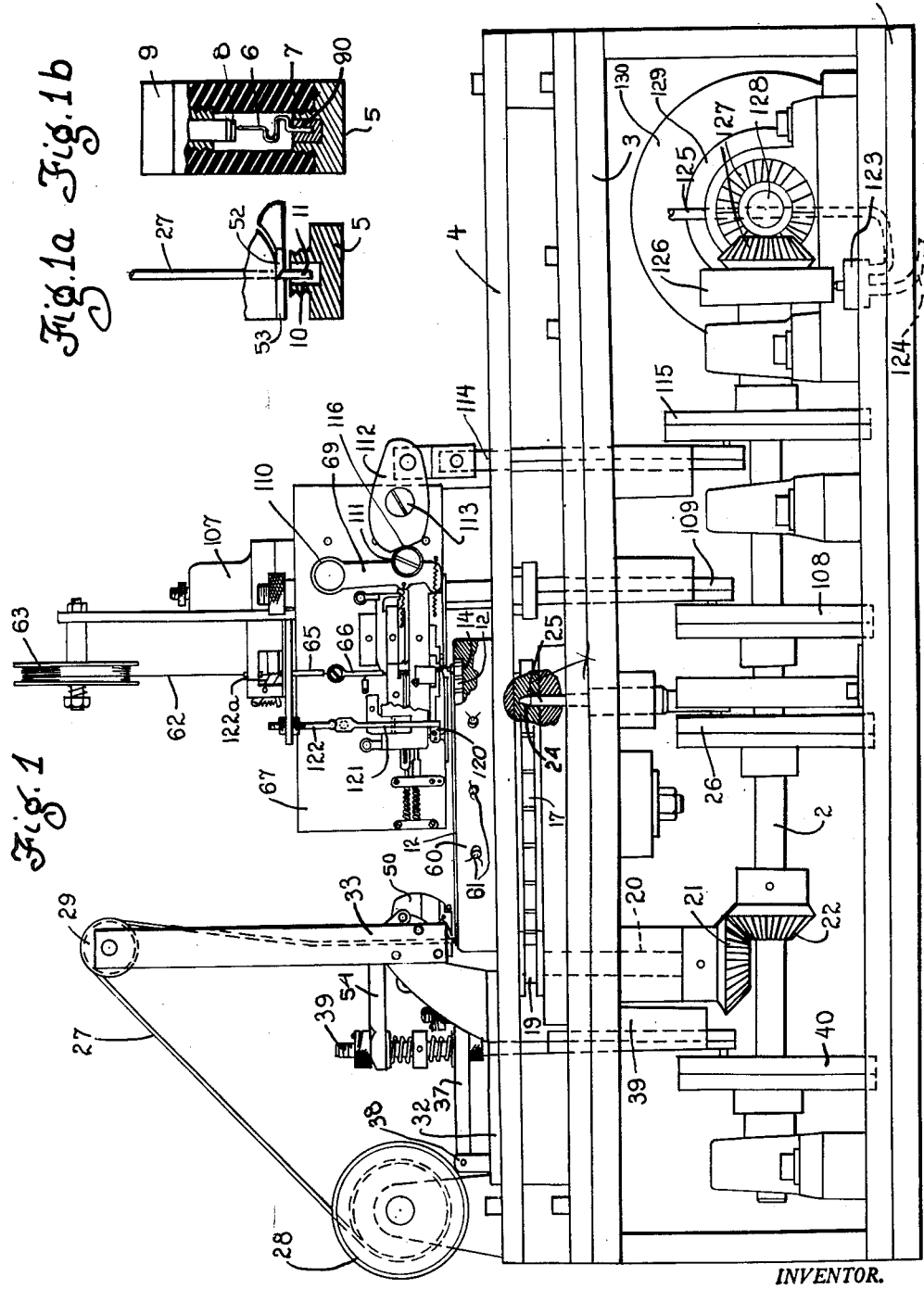
INVENTOR.
Leland H. Fisler
BY Lawrence Burns,
ATTORNEY

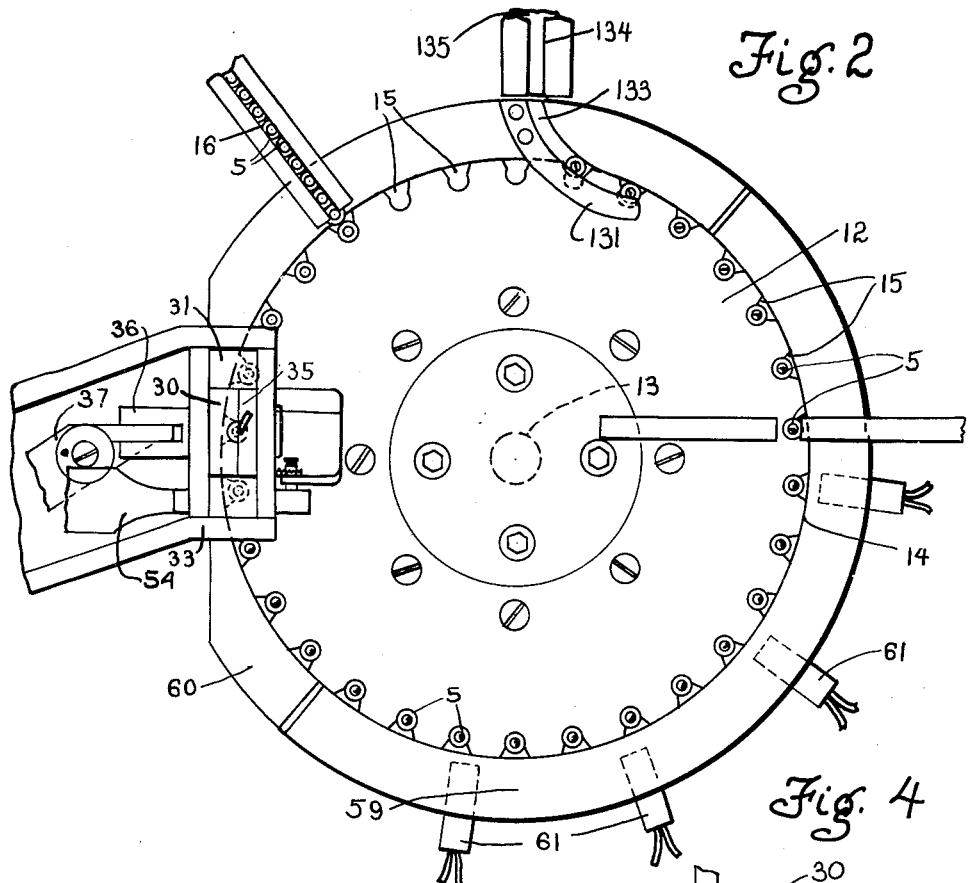
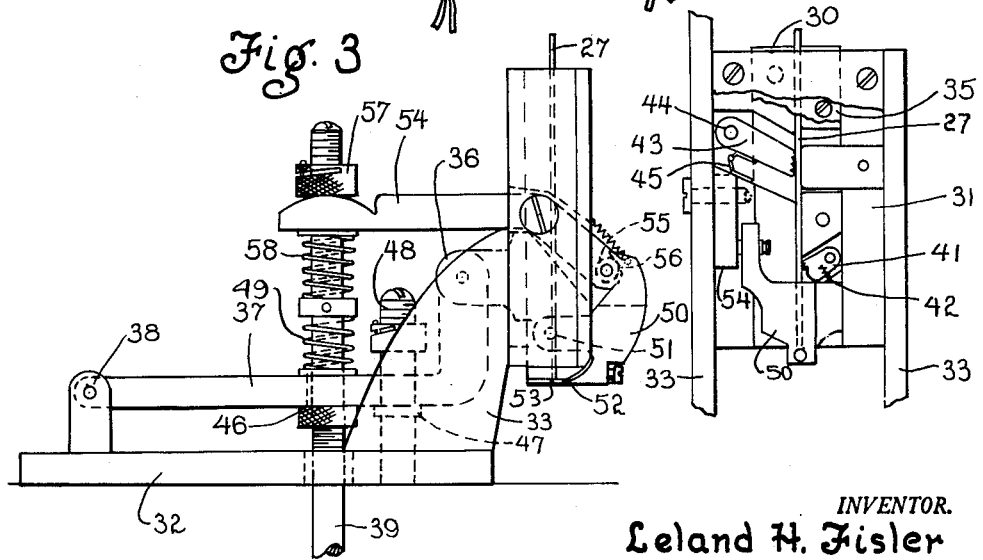
INVENTOR.
Leland H. Fisler

May 4, 1954      L. H. FISLER      2,677,173
AUTOMATIC MACHINE FOR FORMING AND
MOUNTING CRYSTAL DIODE ELECTRODES

Filed June 20, 1947      6 Sheets-Sheet 3

INVENTOR.
Leland H. Fisler
BY Lawrence Burns
ATTORNEY

May 4, 1954
L. H. FISLER
2,677,173
AUTOMATIC MACHINE FOR FORMING AND
MOUNTING CRYSTAL DIODE ELECTRODES
Filed June 20, 1947
6 Sheets-Sheet 4
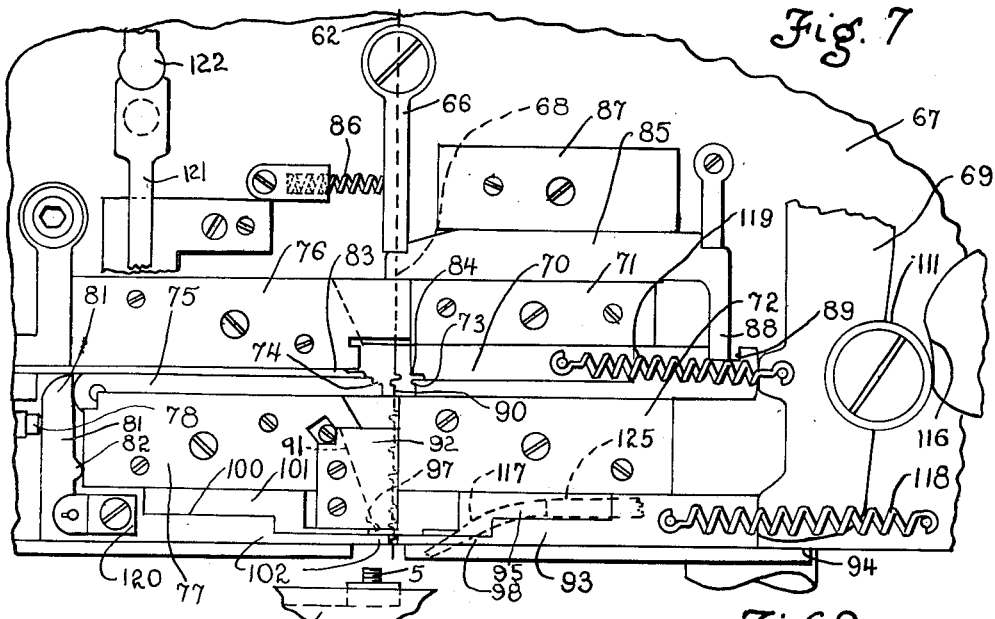
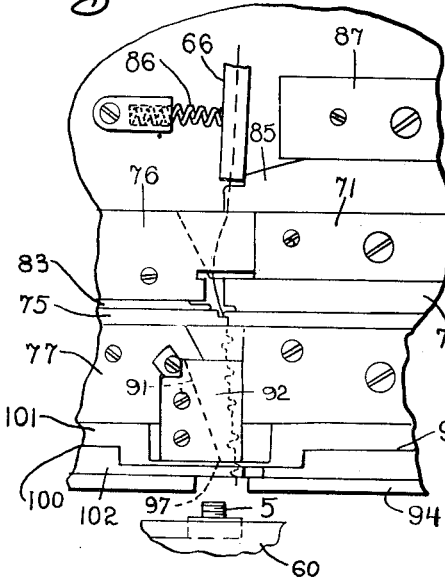
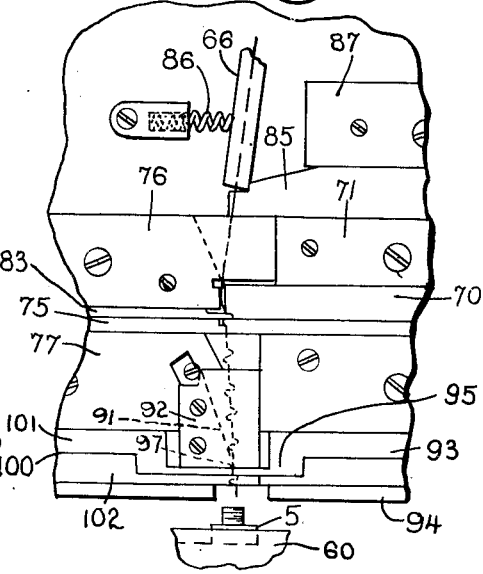
INVENTOR.
Leland H. Fisler
BY
Lawrence Burns,
ATTORNEY May 4, 1954

L. H. FISLER 2,677,173

AUTOMATIC MACHINE FOR FORMING AND
MOUNTING CRYSTAL DIODE ELECTRODES

Filed June 20, 1947

INVENTOR.
Leland H. Fisler
BY
ATTORNEY

May 4, 1954  L. H. FISLER  2,677,173
AUTOMATIC MACHINE FOR FORMING AND
MOUNTING CRYSTAL DIODE ELECTRODES
Filed June 20, 1947  6 Sheets-Sheet 6

INVENTOR.
Leland H. Fisler
BY
Lawrence Burns,
ATTORNEY

Patented May 4, 1954

2,677,173

UNITED STATES PATENT OFFICE 2,677,173

AUTOMATIC MACHINE FOR FORMING AND MOUNTING CRYSTAL DIODE ELECTRODES

Leland H. Fisler, West Newbury, Mass., assignor to Sylvania Electric Products Inc., Salem, Mass., a corporation of Massachusetts Application June 20, 1947, Serial No. 755,830

8 Claims. (Cl. 29—25.3)

This machine is for cutting, forming and mounting a cat whisker or electrode for a crystal type rectifier and mounting it in a brass cup in solder.

The cups are magazine fed to a circular conveyor wheel having a plurality of recesses to receive individual whisker mounting bases. The conveyor carries the cups to a solder supply station wherein the fluxed solder wire is fed down into a cup directly below it a measured amount, and cut off. Immediately after this solder is fed and cut the carrier wheel is indexed which strips the severed solder from the wire positively.

The base and solder is then carried through a heating zone where the solder melts. The melted solder and base then arrive at a station for inserting the whisker. This station has a spool of tungsten wire the end of which is fed down through a series of forming members and thence into the brass base below where its end penetrates the solder. At this time the whisker is being held in true alignment both along the side faces of its bend portion and also in a plane at right angles thereto. The wire is then severed by a pair of shearing members and after the solder cools the completed assembly is fed out for further operations.

The forming operation is performed successively along the wire at intervals so spaced that each whisker when cut will have the correct dimension. About four such completed whiskers are formed upon the wire and the bottom one of the group is cut free after its end is inserted in the solder and the solder is hardened by an air blast.

An object of the invention is to provide an automatic machine for accurately positioning and soldering a fine wire to a base member to serve as the metallic contact of a crystal diode.

A further object of the invention is to provide a machine of the type described in which several of the steps of the complete operation are performed simultaneously.

A further object of the invention is to provide a machine in which the delicate wire contact of the assembled product is held rigidly in correct position with respect to its base until the solder in which it is set hardens.

A further object of the invention is to provide a machine of the type indicated which is rugged in structure and highly efficient in operation.

A further object of the invention is to provide a machine in which all of the motions necessary are derived from a single cam shaft which insures consistent timing of each operation.

Other objects and features of the invention will more fully appear from the following description and will be particularly pointed out in the claims.

To present a clear and complete understanding of the invention a specific embodiment thereof will be described and illustrated in the drawings in which:

Figure 1 is a side elevation of the machine.

Figure 1a is a detail view showing the means for cutting off and depositing solder in a base member.

Figure 1b is a partial sectional view of a crystal diode in which the formed wire is mounted.

Figure 2 is a plan view of the feed or conveyor plate which moves the whisker supporting base member into the respective processing stations.

Figures 3 and 4 are detail views of the mechanism for feeding the solder wire.

Figure 7 is an enlarged detail side elevation of the wire forming mechanism.

Figures 8 and 9 are detail views showing the operation of the wire forming members.

Figure 5:
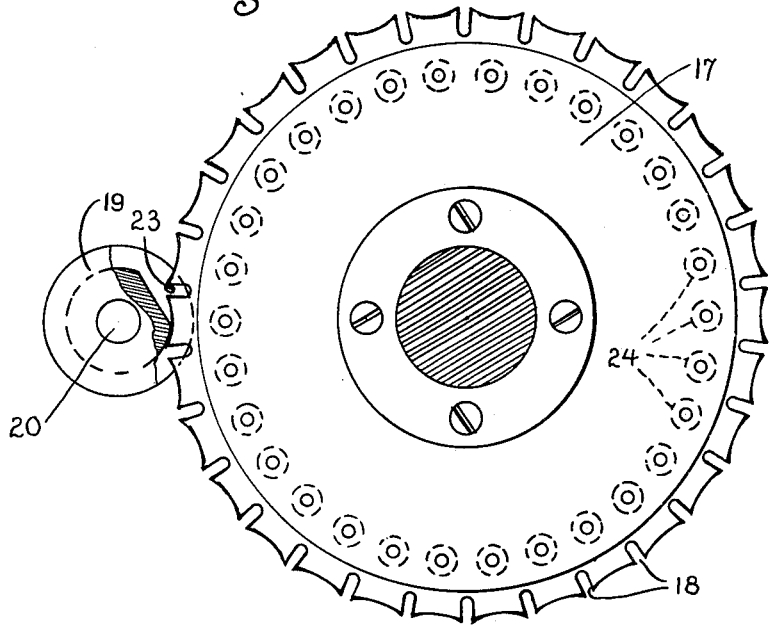
Figure 5 is a detail view showing the indexing means for the conveyor wheel.

The machine is mounted upon a framework composed of a base 1 upon which the main motivating cam shaft 2 is rotatably mounted. Spaced above the shaft 2 and secured to the base 1 is a flat supporting surface 3 and spaced above that is another supporting plate 4.

The machine is constructed to receive an electrode or cat whisker mount or base 5 of metal and mount the cat whisker 6 therein. The mounted cat whisker is received in a hollow cylinder of insulation 7 in the other end of which is received a crystal 8 mounted upon another metallic base 9. The whole assembly constitutes a crystal diode rectifier. The diode may however, have any structure and consequently the base 5 may have a form other than that shown. The base is provided with a recess 10 into which a small slug of solder 11 is placed.

Desirably the bases 5 are magazine fed to a conveyor wheel 12 mounted for rotation upon a vertical shaft 13 journaled in the support plates 3 and 4. The conveyor 12 rotates within a recess 14 the bottom and sides of which act to hold the bases 5 within a plurality of recesses 15 in the periphery of the conveyor and at a fixed level. The bases 5 are fed by gravity into the recesses 15 from the magazine track 16. The track 16 is kept filled with bases in any desired manner as by means of an automatic feeding device not shown.

The bases are moved into operating position by indexing the plate 12. Any suitable means may be used for this purpose. A desirable means is illustrated in Figure 5 in which a Geneva type of motion is employed in which an index wheel 17 is secured to and rotates with the shaft 13. The periphery of the wheel 17 is provided with a series of radial slots 18 the number of which corresponds to the number of recesses 15 in the wheel 12. The wheel 17 is operated by the driver member 19 which is mounted upon a vertical shaft 20. The lower end of the shaft is provided with a bevel gear 21 meshing with another bevel gear 22 mounted on the cam shaft 2. The gears desirably have a one to one ratio, thus the plate 12 is indexed once per revolution of the shaft 2. The driver 19 is provided with a pin 23 which enters the slots 18 to produce the desired indexing movement.

The plate 17 is provided with a series of locking apertures 24. Upon completion of the indexing movement a locking pin 25 having a tapered end and vertically movable in the machine frame. The pin 25 projects into one of the apertures 24 which are tapered to correspond to the pin taper and is operated by a cam 26 on the shaft 2.

The solder 27 for mounting the cat whisker is desirably supplied in wire form wound upon a spool 28. The solder is passed over an idler 29 and thence downward into a solder feeding block 30 vertically movable in the guideway 31. The guideway is secured in a supporting frame 32 which in turn is secured to the top section 4 of the main frame of the machine. The frame 32 is provided with upstanding ear portions 33 to which the guideway is secured.

The solder 27 is threaded through a slot extending vertically downward of the feed block 30. The slot is closed by a cover plate 35 screwed to the block 30. Thus the solder wire is confined to the slot as it is fed downward therethrough.

The block 30 is provided with a projection 36 fixed rigidly thereto and projecting through a slot in the back of the guideway. The projection is provided with a slot within which one end of an actuating lever 37 is pivoted. The other end of the lever is fulcrumed upon the frame 32 at 38.

The lever is actuated by a rod extending down through the platform 4 and vertically guided in a guideway 39 rigid with the support plate 3. The rod 39 is moved up and down the required amount to feed the proper amount of solder for each base member 5 by the cam 40 mounted on the cam shaft 2. The cam is designed and positioned on the shaft to actuate the lever 37 in predetermined timed sequence in the machine cycle.

Means are provided to feed the solder the required amount upon the downward movement of the block. Desirably the feed block 30 is provided with a feeding dog 41 pivoted thereon and received in a recess in the block. The dog is disposed upward at an angle from the horizontal and is provided with teeth on its outer edge to engage the solder. A spring 42 acts to urge the dog 41 against the solder and as the block 30 moves down the dog firmly grips and moves the solder down unrolling it from the spool 28.

Another gripping dog 43 is pivoted upon the fixed point 44 upon the guideway 31. The dog 43 is disposed at an angle above the horizontal and is provided with teeth on its outer edge to engage the solder. When the solder is moved down by the dog 41 the dog 43 permits the solder to move down freely since such feeding movement tends to move the dog away from holding engagement with the solder.

Upon upward movement of the feed block 30 the dog 43 tends to move in a counterclockwise direction and firmly grips the solder to prevent upward movement thereof. The gripping action of the dog is maintained by a spring 45.

During the upward movement of the block 30 the dog 41 releases its grip and slides freely along the solder. The amount of solder fed is determined by the throw of the cam 40 and also by the stop 46 which has threaded adjustment along the actuator rod 39. The limit of the upstroke is determined by the position of the stop 46 while the bottom position of the feed block is determined by engagement of the lever 37 with a stop 47 on a fixed rod 48. A spring 49 on the rod 39 holds the lever 37 against the stop 46 and permits the rod 39 to have a greater downward motion than is necessary for the travel of the feed block 30.

Means are provided to cut off the solder that is fed down. To do this a cutter member 50 is pivoted at 51 on the feed block 30 and is provided with a cutting blade 52 which coacts with an anvil surface 53 on the end of the block to sever the solder each time it is fed down. The severed portion 11 remains in the aperture 10 in the base member 5 after it is cut from the main supply wire 27 as shown in Figure 1a.

The cutter member 50 is actuated by a lever 54 pivoted upon the guideway 31. The lever 54 is bifurcated and embraces the rod 39 at one end and is provided with a roll 55 at its other end. The roll engages a cam surface 56 upon an upward extension of the member 50. The lever 54 is actuated by engagement with an adjustable collar 57 on the upper end of the rod 39. The lever is held against the collar by a spring 58 on the rod. The throw of the lever is so adjusted and timed that the final downward travel of rod cuts the solder.

The bases 5 are then indexed through a heating zone 59. The heat is applied to the ring 60 surrounding the indexing plate. The heat desirably is supplied by a plurality of electric heating units 61 received in apertures in the rims. The correct temperature is transferred to the index wheel and to the bases 5 to melt the solder. Automatic temperature regulation desirably is provided. The cam 40 is so designed that after the solder cutter has severed the solder the feeding head 30 remains in its bottom position until after indexing has taken place. By so doing the severed portion 11 of the solder is positively stripped from the end of the solder wire 27. Thus if the cutter has not entirely severed the solder or if a tacky condition of the parts develops due to the presence of flux the indexing motion will insure that the solder will not be withdrawn from its base member when the feed block is raised.

The bases are now ready to receive cat whiskers which are supplied by a whisker forming and feeding mechanism mounted upon the supporting plate 4 substantially diametrically opposite the solder station and at the periphery of the wheel 12.

The cat whiskers or electrodes are formed from a tungsten or other suitable metallic wire 62 supplied from a spool 63 or other source. Desirably the wire may pass through a conventional detecting device not shown which automatically produces a signal or stops the machine when the supply of wire becomes exhausted.

The wire is fed down through a fixed guide tube 65 and into a pivoted guide tube 66 and thence into the forming and shearing elements mounted successively below each other upon a supporting frame 67 having a flat vertical mounting face to receive them. The formers, shearing elements and their guiding blocks are all finished to present front faces which are in a common plane and are enclosed by a cover plate 68 shown in dotted lines in Figure 7 and broken away in Figure 6. Clearance is provided between the plate 68 and the movable members.

The forming members are actuated by a lever 69 the operation of which will be described hereinafter. The first forming member 70 is horizontally guided by guides 71 and 72 and is moved inward toward the left by the lever 69.

The wire 62 is fed downward through slots in the various guide members and the finished whiskers emerge at the bottom in position to be received in the base members 5 which are indexed into proper position. The former 70 engages and shapes the lower lobe of the bent portion of whisker and is provided with a male die portion 73 which coacts with a female portion 74 upon a coacting former member 75 as shown in Figure 7.

The former 75 is horizontally guided by a top guide 76 and a bottom guide 77. It is yieldingly held in its right hand position by a plunger 78 which is urged to the right by a spring 79. The plunger is guided in a pair of supports 80 mounted on the frame 67. The plunger engages a lever 81 which in turn at one end engages the member 75. The lever has a fulcrum 82 bearing against the end of the guide 77 while the bottom end of the lever 81 engages a clamping member to be described.

Continuing with the operation of the formers, after the opposing vertical face of the formers 70 and 75 engage and clamp the wire further movement of the member 70 forces the member 75 toward the left until a fixed male forming member 83 enters a female recess 84 in the former 70. The upper lobe of the bent portion of the whisker is thus formed as shown in Figure 9.

Simultaneous with these forming operations a slide 85 is moved to the left and engages the pivoted member 66 moving it into the angular positions shown in Figures 8 and 9 thus directing the wire into the position to which it has been forced by the formers. A spring 86 maintains the member 66 in engagement with the slide 85. The slide is guided between the guide 71 and a top guide 87 and is provided with a downwardly directed projection 88 which enters a slot 89 in the former 70. The slot is enlarged to provide a measured degree of lost motion to permit the former to engage the wire before the member 66 starts to move.

During the whisker forming operation the lower straight portion 90 of the whisker is clamped between the two formers 70 and 75 as above described the required wire to form the lobes is thus drawn from the spool 63 and does not disturb the whiskers previously formed and now below the forming point. As successive whiskers are formed in an uncut series they pass downward through slots provided therefor in the various guides and also through a slot in a shearing member, to be described, until the bottom one reaches a position where it is inserted in a base and then severed.

A highly effective and efficient feature of the machine is the manner in which the whiskers are held in alignment while they are inserted in their bases and finally severed from its connection with the main supply thereof. The lower end of the series of formed whiskers passes through a narrow slot 91 in a cut off block 92 that is fixed to frame or head 67 which, as will be seen, is vertically reciprocated.

The bottom whisker is accurately aligned, clamped and cut off during its insertion in a base 5, by a pair of composite manipulating members which are fed inward toward each other at the bottom of the forming assembly.

The right hand member 93 is guided horizontally by the bottom edge of the guide 72 (Fig. 7) and a bottom plate 94 which has a recess through which the whiskers are fed.

The member 93 has an upper portion 95 presenting a front face 96 (Fig. 6) which acts as one member of a whisker clamp. The upper edge of this face serves as a shear to cut the wire. The other member 97 of the shear is situated in the plane of the cutting edge of the face 96 and is located at the junction of the bottom face of the fixed block 92 and the lower extremity of the inner wall of the slot 91 therein.

Figure 6:
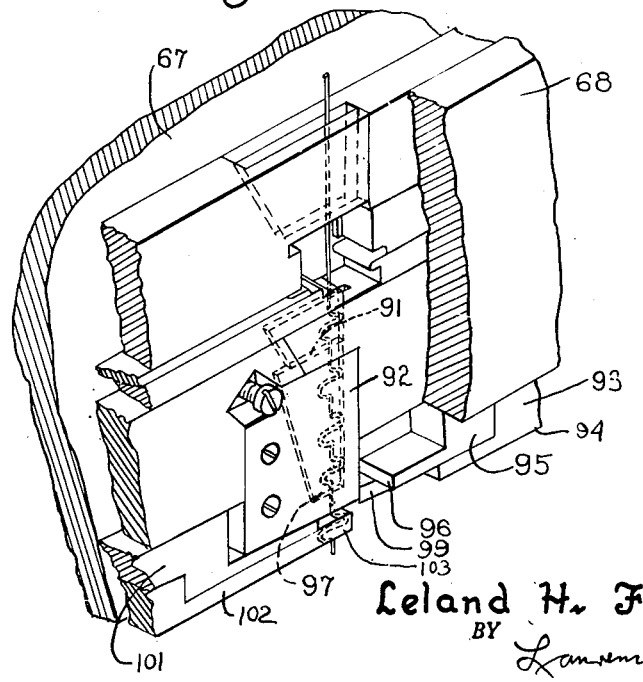
Figure 6 is a sectional perspective detail view of the wire forming mechanism.
Figure 10:
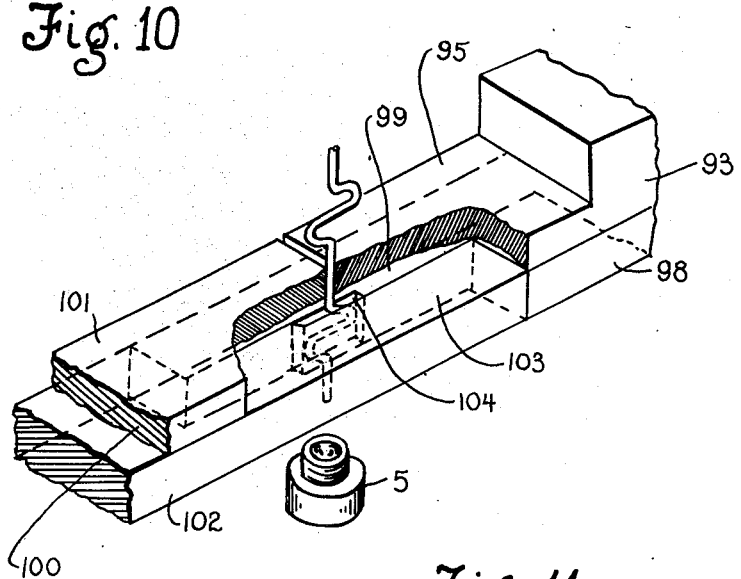
Figure 10 is an enlarged detail view of the members for supporting a formed wire electrode or cat whisker while it is mounted in its base.
Figure 11:
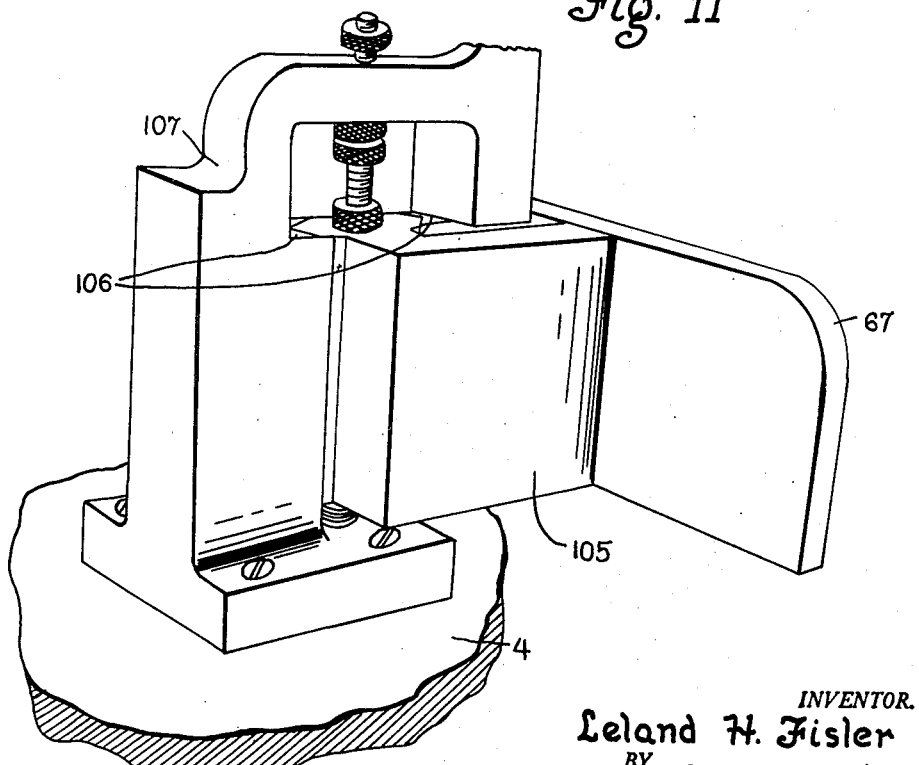
Figure 11 is a perspective view showing the means for vertically guiding the forming, positioning and mounting head.
Figure 12:
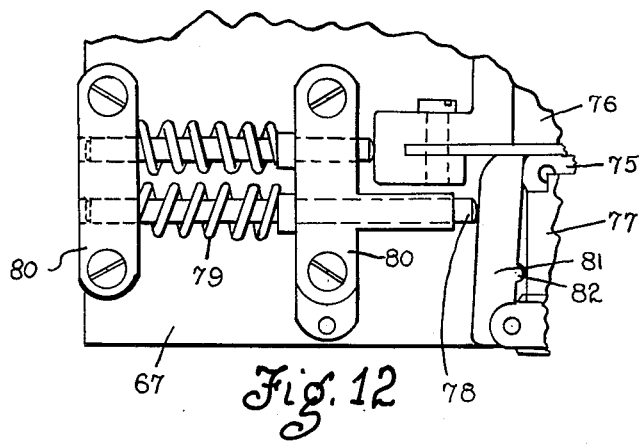
Figure 12 is a detail view showing the spring controlling means left hand members of the electrode forming clamping and positioning members.
Figure 13:
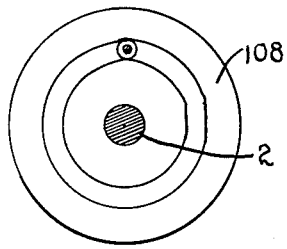
Figures 13, 14, 15, 16, 17 are side elevations of the various cams which actuate the machine.
Figure 14:
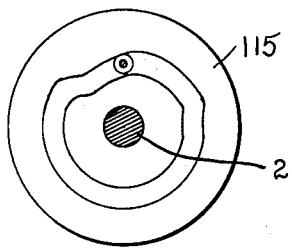
Figure 15:
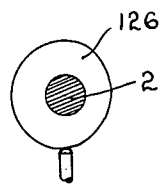
Figure 16:
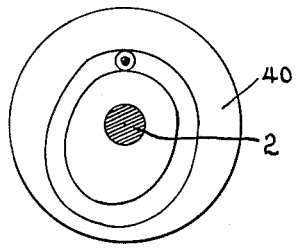
Figure 17:
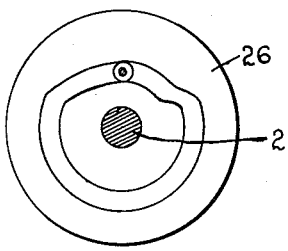

The bottom portion 98 is secured to the top portion in any suitable manner as by screws. The member 93 is made in two sections to facilitate its fabrication. The bottom portion 98 acts as one member of a lateral stabilizer for the bottom whisker. The inner or active portion of the member is cut away for one half of its width to present supporting portion 99 which is adapted to lie along one side of the bent portion of the whisker as shown in Figures 6 and 10.

Cooperating with the member 93 is another composite member 100 (Fig. 10) consisting of an upper clamping member 101 coacting with the member 95 to clamp the upper straight portion of the whisker. The lower portion 102 is cut away for one half its width to present a supporting member 103 which lies parallel to the member 99 and on the opposite side of the whisker.

The opposed inner faces of the members 99 and 103 are provided with offset portions which when fitted together provide a narrow chamber 104 whose width closely embraces the flat sides of the bent portion of the whisker. The offset portions are of such length that when the members 93 and 100 are in their innermost position the end walls of the chamber 104 are spaced a short distance from the upper and lower lobes of the whisker. As shown in Figure 10 the whisker is accurately held in correct alignment to be inserted in its base member 5.

The member 93 is moved inward by the lever 69 simultaneously with the member 70. Continued movement of the member 70 beyond its engagement with the member 75 rocks the lever 81 as above described to move the member 100 inward. The inward movement of both members 93 and 100 is so correlated that the two clamping members 95 and 101 will clamp the whisker at a position either at the cutting point or a short distance to the right thereof. In the latter case further motion to the left of the member 93 carries all of the members involved to the left which carries the whisker wire into cutting position when the cutting edge of the face 96 reaches the point where the last whisker is severed from the series of formed whiskers.

The final position of the severed and aligned whisker is accurately determined at the axis of the base member 5 a short distance below the whisker as shown in Figure 9.

At this time the forming head 67 is moved down bodily an amount equal to the overall length of a whisker. To provide for this movement the head 67 has a rearward extension 105 which is received in vertical ways 106 in rigid framework 107 mounted upon the plate 4. The downward-movement of the head inserts the bottom of the whisker in the molten solder and since the wire is anchored in the head by reason of the clamping action of the forming members the downward movement of the head pulls wire from the spool 63. The motion of the head is derived from a cam 108 on the shaft 2. The motion is transmitted from the cam to a rod 109 which is guided upward through the supporting plates 3 and 4 and is connected at its upper end to the head 67.

The lever 69 is pivoted on the plate 67 at 110 and is provided with a roll 111 which is engaged by a lever 112 pivoted on the plate 67 at 113. The outer end of the lever 112 has pivotally connected thereto a link 114 which extends downward through plates 3 and 4 and is guided in ways secured to the supporting plate 3. The link 114 is provided with a cam follower which extends into the groove of a cam 115 on the shaft 2. The lever 112 is provided with a cam face 116 which is designed to coordinate the motion it imparts to the lever 69 with that of the motion derived from the cam 115 to develop the required motion of the forming and cut off elements.

After the whisker has been inserted in its base and before the clamping and aligning means are retracted a blast of cold air from a jet 117 is directed upon the solder which solidifies it after which the cam 115 acts through the rod 114 and lever 112 to permit the springs 118 and 119 to retract the forming and cutting elements horizontally. The spring 118 holds the element 93 against the lever 69 and is itself anchored on the plate 67 thus it acts to maintain the follower 111 against the cam face 116. A spring 119 holds the former 70 against the lever 69.

As seen from Figs. 8 and 9, the lowermost formed whisker is shifted to the left by composite member 93 during the shearing operation. Member 93 carries clamping member 102 to the left, for positioning the whisker in line with cup 5. During the retracting movement of composite member 93, the clamping member 102 would normally tend to move toward the right and thus deform the completed base and whisker unit. To prevent this the member 102 is provided with an abutment 120 which coacts with a spring actuated locking lever 121 pivoted upon the plate 67 to swing laterally. The lever is positioned to swing into locking position with respect to the abutment when the clamping member has reached its extreme left hand position and is held in that position during retraction of the parts. After retraction of the parts the assembled base and whisker are indexed away from the forming and mounting station (away from one viewing Figs. 6–9) and another base is moved into position to receive a whisker. Portion 99 of composite member 93 is retracted sufficiently to provide clearance for the whisker on the cup 5 being thus advanced with the rotary conveyor 12.

The forming and mounting head is now raised to its upper position again at which time the upper end of the lever 121 engages a rigid cam member 122 secured adjustably to the frame 107. The member 122 engages an inclined face on the lever and swings it out of locking position which permits the clamp member 102 to resume its normal functions. The above cycle of operations is repeated as the bases are fed successively into their processing positions. During the upward movement of the head 67 it is desirable that the wire 62 be held against movement. This may be accomplished by providing a one way clutching device 64 fixed to the frame 107 and through which the wire passes. The clutch is provided with a spring actuated dog 122a which permits downward motion of the wire but locks against the wire to prevent upward motion thereof.

Cooling air for the jet 117 is supplied from a suitable source of compressed air not shown. Air is fed from the source to an air valve 123 through a pipe 124 from the valve air is conducted to the jet through a pipe 125. The valve is operated in timed relation to the machine cycle by the cam 126 on the shaft 2.

Any suitable means may be provided to drive the shaft 2. As shown a pair of bevel gears 127 establish a drive from a shaft 128 to the shaft 2. The shaft 128 may desirably be connected to a speed reducing unit 129 which in turn is driven by a motor 130.

To aid in understanding the general operation and the timing of the function of each of the machine elements Figures 13, 14, 15, 16 and 17 illustrate face views of all the cams shown in their respective positions upon the cam shaft 2.

Any suitable means may be employed to remove the mounted cat whisker from the index wheel. As shown herein a curved plate 131 is mounted upon the ring 60 close to the surface of the index plate 12. The plate 131 is so shaped and positioned that its outer edge will engage the inner side of the projecting neck portion of the base members 5. As the plate 12 is indexed the completed whisker assemblies are cammed out of their recesses in the wheel and travel through a slot 133 and thence into a channel 134 which may be provided with a conveyor belt 135 to carry the assemblies away from the machine and if desired to another machine for further processing.

What I claim is:

1. In an automatic machine for forming and mounting a wire electrode having means to supply mounting bases with molten solder thereon, an electrode forming and holding head, means to support a supply of wire and to deliver such wire to the head, a plurality of forming members on said head, means to actuate said formers in succession to form a series of interconnected electrodes from said wire, clamping means on said head acting to clamp and position the bottom electrode of said series, means to move said head bodily downward to insert the bottom electrode in the molten solder of said base and to hold said electrode and said base in fixed relation until the solder hardens, and means to cut the electrode from said series.

2. In a machine for forming and mounting wire electrodes, an electrode forming and positioning head, means to support a supply of wire, means to feed the wire to the head, a plurality of forming members on said head for shaping the electrodes, a number of clamping, cutting and positioning members including a combined cutting and clamping member, means for moving said latter members into engagement with a formed electrode to clamp and position it, and means to further move the cutting and clamping member while in clamping position to cut the electrode to predetermined length from the supply of wire.

3. In a machine for forming and mounting wire electrodes an electrode forming and positioning head, means to support a supply of wire, means to feed the wire to the head, a plurality of forming members on said head for shaping a series of interconnected electrodes from said wire, means to move the formers into shaping position, a combination of clamping, cutting and pisitioning members including a combined clamping and cutting member, means to move said combination of members into positioning and clamping engagement with the bottom electrode of said series while said formers are in active position, overlapping end portions on the coacting clamping members to laterally support said bottom electrode, a fixed cutting edge, means to further move said clamping members while in clamping position, to move the electrode a distance at least sufficient to engage the fixed cutting edge to cut the electrode to predetermined lentgh, means to lock one of said combination of clamping members in the position it has been moved to effect the cutting of the wire, means to retract said formers and combined clamping, positioning and cutting members except the locked member and means to release said locked member during a subsequent portion of the machine cycle.

4. An automatic machine for soldering a wire element to a metal base, including heating means for heating such metal bases successively, means for supplying the wire elements in succession spaced laterally of said heating means but sufficiently close thereto to avoid excessive cooling of the heated metal bases, and a conveyor formed to receive a series of metal bases and adapted to transfer them stepwise in succession past said heating means and said wire element supplying means, said conveyor having means for retaining each metal base in a fixed plane during travel thereof and in position opposite said heating means and said wire element supplying means, said supplying means being reciprocable toward and from said conveyor to insert the wire elements into solder carried by the bases and melted by the heating means, said reciprocable supplying means and said conveyor being timed for fixed mutual positioning after insertion of a wire element into a base until the solder in the previously heated base has solidified.

5. An automatic machine for soldering a wire element to a metal base, including heating means, means for supplying wire elements in succession, a conveyor formed to receive a series of metal bases and adapted to transfer them stepwise in succession past said heating means and said wire element supplying means, said conveyor having means for retaining each metal base in a fixed plane during travel thereof and in position opposite said heating means and said wire element supplying means, said wire element supplying means including jaws mutually separable along a line transverse of the path of the bases as established by the conveyor and reciprocable as a unit in a direction substantially perpendicular to both the path of the pases and the separating motion of the clamping jaws, whereby the wire element can be inserted by the jaws into solder carried by the bases, which jaws can then be separated to afford a free path for the wire element previously inserted to advance beyond the suppying and inserting means.

6. In an assembling machine of the class described, a conveyor for advancing bases successively past an assembling station, and means at said station for inserting wire elements, said inserting means including supporting means for guiding a length of wire toward the conveyor, a combination forming and cutting die, including forming elements reciprocable transverse of the wire into mutual engagement, the line of reciprocation of the forming elements being transverse to the path of the bases as established by the conveyor, a pair of shearing elements mutually reciprocable with said forming elements and a pair of gripping and transporting elements receiving the severad wire element and transporting it along a line of reciprocation transverse of the path of said bases, means for moving the combined die endwise toward the conveyor for inserting a severed element, a latch for locking one of the gripping elements in element-delivering position, and means for withdrawing the second of the gripping elements, thus releasing the inserted wire element and providing a clear path for the assembled wire and base to advance with the conveyor.

7. In a machine of the class described, a rotary conveyor for moving a series of bases step-wise along a path past an assembling position, a pair of gripping elements both movable radially of said conveyor while gripping a component to be assembled to one of those bases, said gripping elements being positioned close to the conveyor to hold the component in assembled relation opposite one of the bases, a latch mechanism engaging one of the gripping elements in its final position opposite the base, and means for retracting the other of the gripping elements while the first is thus latched, so that an element is released and a clear path is provided for the advance movement of the assembled base and inserted element.

8. A combined assembling and soldering machine including means for delivering succesive measured charges of solder, heating means, and inserting means, a rotary conveyor movable stepwise to carry bases successively to the solder-delivering means, the heating means and the inserting means in the order named, so that the charges of solder are melted before reaching the inserting means, said inserting means including a gripping device having two members movable together radially opposite a base in the inserting position, and then movable as a unit perpendicularly toward that base, and means for separating said gripping radially in relation to the rotary conveyor, whereby an element delivered by said gripping means into the molten solder has a clear path to advance beyond said inserting means.

References Cited in the file of this patent

UNITED STATES PATENTS

| Number | Name | Date |
| --- | --- | --- |
| 1,801,108 | Reufel et al. | Apr. 14, 1913 |
| 1,220,836 | Frech et al. | Mar. 27, 1917 |
| 2,251,434 | Weiss et al. | Aug. 5, 1941 |
| 2,419,484 | Danziger | Apr. 22, 1947 |
| 2,567,396 | Peterson | Sept. 11, 1951 |